United States Patent [19]

Champie, III et al.

[11] Patent Number: 4,807,921
[45] Date of Patent: Feb. 28, 1989

[54] SLIDING COVER FOR TRUCK BED

[76] Inventors: James M. Champie, III; Canyon D. Champie, both of 7435 W. Cheryl Dr., Peoria, Ariz. 85345

[21] Appl. No.: 74,271

[22] Filed: Jul. 16, 1987

[51] Int. Cl.$^4$ ................................................ B60J 7/10
[52] U.S. Cl. ...................................... 296/98; 296/100; 160/235
[58] Field of Search ................... 296/98, 100; 160/133, 160/235, 236

[56] References Cited

U.S. PATENT DOCUMENTS

| | | | |
|---|---|---|---|
| 3,146,824 | 9/1964 | Veilleux | 296/9.8 |
| 3,416,836 | 12/1968 | Ohle | 296/100 |
| 3,488,087 | 1/1970 | Cox | 296/100 |
| 3,649,072 | 4/1972 | Cross | 296/100 |
| 3,986,749 | 10/1976 | Hull | 296/100 |
| 4,138,154 | 2/1979 | McKeon | 296/98 |
| 4,210,361 | 7/1980 | Marvin | 296/100 |
| 4,252,362 | 2/1981 | Campbell | 296/98 |
| 4,433,714 | 2/1984 | Barber | 160/235 |
| 4,518,194 | 5/1985 | Kirkham | 296/100 |
| 4,547,014 | 10/1985 | Wicker | 296/100 |
| 4,611,848 | 9/1986 | Romano | 296/98 |
| 4,634,172 | 1/1987 | Duda | 160/235 |

*Primary Examiner*—Robert R. Song
*Attorney, Agent, or Firm*—Lathrop & Clark

[57] ABSTRACT

A sliding cover assembly is provided primarily for a truck cargo bed. The sliding cover assembly is mounted on the top edge of the side walls of the cargo bed and includes a plurality of longitudinal, arcuate parallel-disposed rotatably interconnected slats which slide on a low friction surface within the guide means attached to the side walls of the cargo bed. The sliding cargo assembly further includes a lockplate attached to the leading edge of the sliding cover which secures the cover to the tailgate of the cargo bed.

14 Claims, 4 Drawing Sheets

SLIDING COVER FOR TRUCK BED

BACKGROUND OF THE INVENTION

1. Field of the Invention

The present invention is generally directed to a sliding cover assembly and specifically directed to a sliding cover assembly for attachment to an open cargo bed of a truck.

2. Description of Prior Art

There are a variety of covers which can be used on an open cargo truck bed. These include canvas or rubber covers which are strapped onto the cargo bed or other track mounted assemblies.

More sophisticated types of cargo bed covers employ elongated, rigid slat-like members. For example, U.S. Pat. No. 3,146,824 to Veilleux is directed to a flexible cover for the open body of a pickup truck in which the cover may be rolled into a housing for storage. U.S. Pat. No. 2,992,040 to Groth is directed to an articulated cover comprising a flexible cover and a plurality of transversely elongated rigid members connected in parallel array to the undersurface of the covering sheet and extending across the body of the truck. U.S. Pat. No. 1,950,927 to McMillan is directed to a cover which includes a parallel array of panels formed from sheet metal. U.S. Pat. No. 3,649,072 to Cross is directed to a cover which includes a plurality of transversely elongated rectangular slats which are forced into stacked relation at the forward portion of the body of the truck. U.S. Pat. Nos. 4,547,014 to Wicker, 4,518,194 to Kirkham, et al. and 3,986,749 to Hull, et al. are also directed covers which include parallel slats which fold into accordian-like folds at the forward section of the truck bed.

U.S. Pat. No. 4,138,154 to McKeon is directed to a cover having a plurality of panels, each of which having a longitudinally-extending generally hooked-shape flange depending from each of the longitudinal edges, one of which is smaller than the other, thus permitting the panels to be interconnected. U.S. Pat. No. 4,210,361 to Marvin is directed to a cover comprising a sheet of corrugated material extending between the tracks and across the open body. The cover includes a plurality of wheels rotatably mounted along the left and right outer margins of the corrugated sheet and within the left and right tracks.

U.S. Pat. No. 4,252,362 to Campbell is directed to a sliding cover assembly characterized by a multichanneled track which permits the user to close off all or just a portion of the open body.

U.S. Pat. No. 4,611,848 to Romano is directed to a sliding cover assembly which includes a plurality of parallel-spaced slats riding along tracks on either side of the side walls of the cargo bed. Connected to these slats are rotatable wheels which aid in the movement of the cover.

However, at best the existing covers have tracks which are flush with the top edge of the side walls of the truck bed. These systems catch water and channel it through a hose which drains through holes drilled in the bottom of the truck bed. Additionally, the sliding covers of the prior art for the most part utilize guide wheels in the track system to aid in the movement of the cover.

SUMMARY OF THE INVENTION

The present invention is directed to a sliding cover assembly which is capable of converting the open body or cargo bed of a truck, such as a pickup truck, to a closed body to protect the cargo from adverse weather conditions and from theft. Additionally, the cover assembly improves the aerodynamics of the truck as it is moving thus reducing wind resistance and improving fuel efficiency. Further, the special design of the track system of the Present invention allows water to be shed over the side walls of the truck cargo bed without ever entering the cargo area. The design of the present invention also provides maximum storage space in the cargo bed. Although the sliding cover assembly of the present invention has been developed primarily for use with a truck cargo bed and is described with this purpose in mind, it is to be understood that the sliding cover assembly can have other uses. For example, it may be used in place of a door in a building.

A principal object of the present invention is to provide a sliding cover assembly for the cargo bed of an open body truck that can be secured to the truck and convert the truck to a closed body truck while providing maximum storage space in the cargo bed.

It is another object of the present invention to provide a sliding cover assembly which protects cargo stored in the cargo bed area of an open body truck from inclement weather and theft.

It is a further object of the present invention to provide a sliding cover for a cargo bed of an open body truck which requires very little space on the truck when the cover is in the open position.

Another object of the present invention is to provide a sliding cover for the cargo bed of an open body truck which can be locked and secured to protect the cargo stored on the cargo bed against theft.

It is still another object of the present invention to provide an improved sliding cover for an open body truck with reduced sliding friction without the need for roller wheels.

Still another object of the present invention is to provide a sliding cover assembly for an open body truck in which the individual slats of the cover assembly are of such a configuration as to afford superior strength to the cover assembly without excess weight.

These and other objects are accomplished by the present invention which is directed to a sliding cover assembly primarily for a truck having an open cargo bed defined by a flat bottom, two side walls, a front wall and a tailgate hingedly mounted to the rear end of the bottom. The sliding cover assembly includes guide means mounted on the top edge of the side walls of the cargo bed. The guide means extend from the front portion of the cargo bed to the rear portion and include a left and right track which forms a C-shaped cross section. Each track includes a lip portion adapted to facilitate positioning of the track to the top edge of the side walls. The cover extends across the open cargo bed and includes a plurality of parallelly-disposed, arcuate, rotatably interconnected longitudinal slats slidably mounted in the tracks. The slats are connected to each other by a rod and socket type connection, wherein a cylindrical rod portion of one slat is rotatably disposed within a C-shaped socket portion of an adjacent slat in a water-tight fashion.

A return means is mounted adjacent the front end of the cargo bed and attached to the forward edge of the cover assembly. The return means includes a rotatable axle around which the cover winds when retracted.

When the cover is assembled and mounted on the cargo bed of a truck, it provides improved security, weather protection and aerodynamics. The assembly is mounted to the truck in such a way that the cover is actually situated above the top edge of the side walls of the truck cargo bed. This allows water to be shed down the outside of the bed for improved weather protection.

A spiral power spring is used in the return means to assist in rolling up the slats. The spring provides an even torque for improved ease of operation.

The arced profile and the rod and socket hinging of the slats provide superior strength without excess weight, a weather seal, and a smaller diameter roll when the cover is retracted. This results in a minimum of cargo space for storage. Further, a smaller roll is more economical to ship, thus minimizing freight charges.

DETAILED DESCRIPTION OF THE INVENTION

Figure 1:
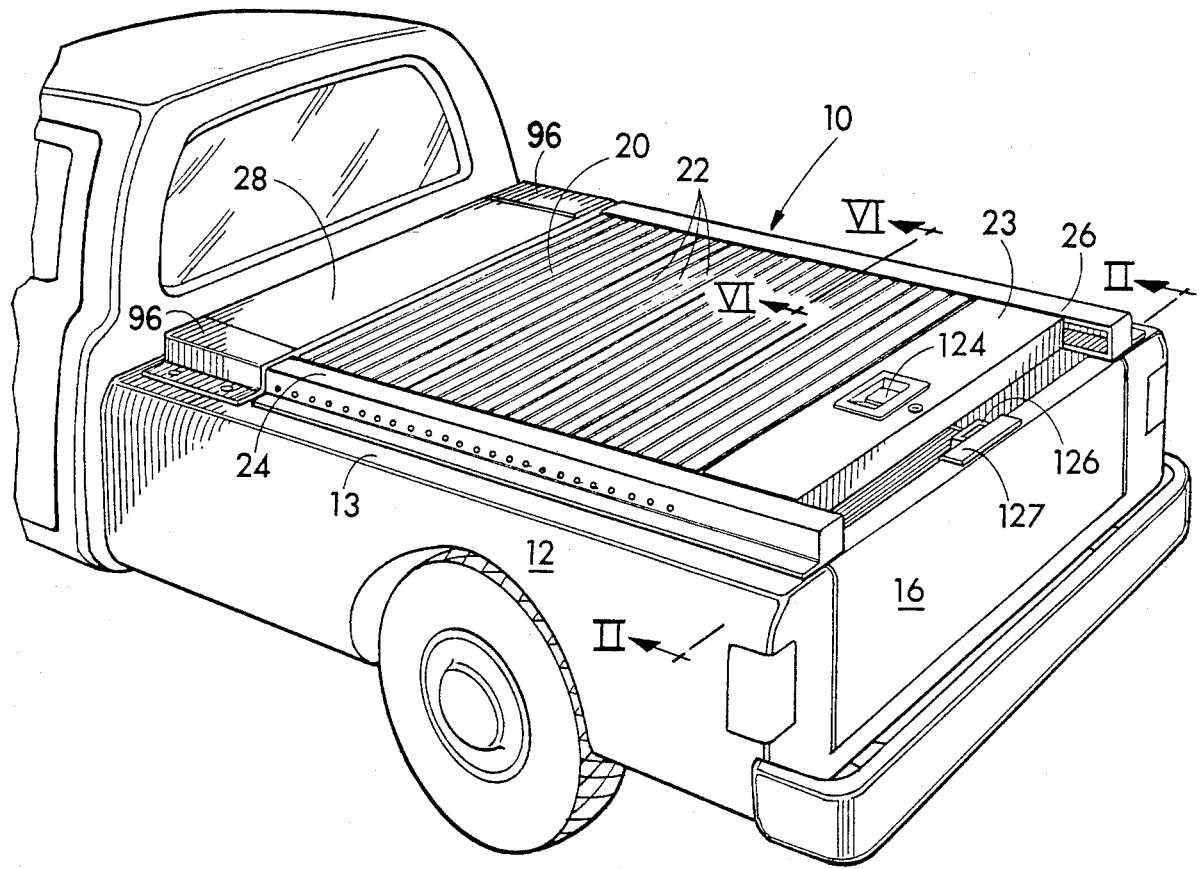
FIG. 1 is a perspective view of the cargo bed of a truck which is equipped with the sliding cover assembly of the present invention.
Figure 2:
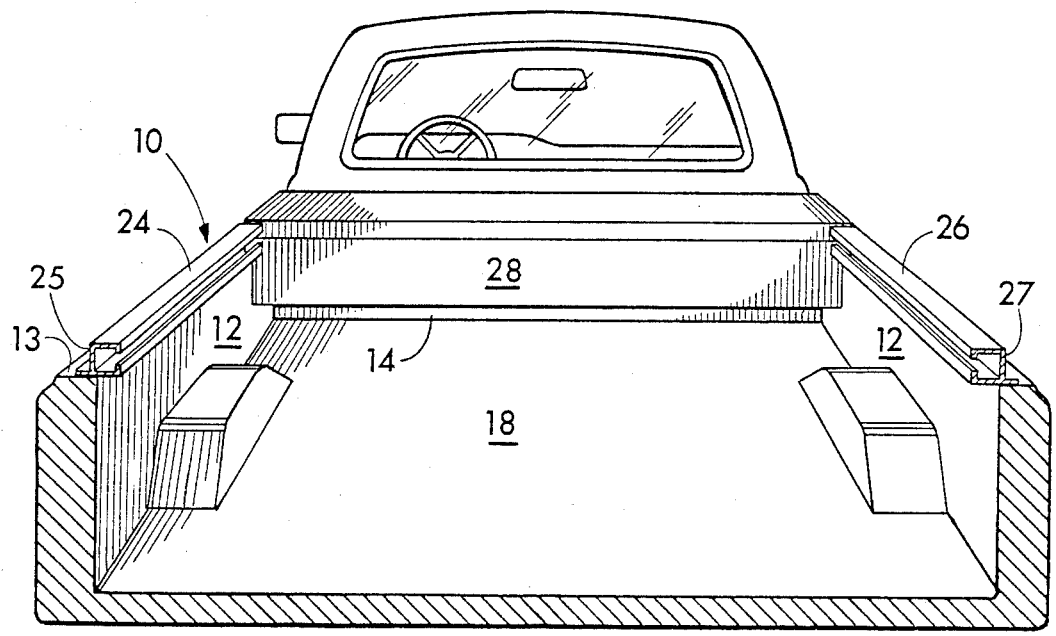
FIG. 2 is a fragmentary sectional view of FIG. 1 taken along line II—II.

Referring now to the figures in which the reference numerals are the same for similar features throughout the several drawings, FIG. 1 illustrates the cargo bed, generally designated by reference numeral 10, of an open body truck, not illustrated in FIG. 1, with the mounted sliding cover assembly of the present invention. Referring now to FIGS. 1 and 2, the open cargo bed 10 of the truck is defined by two side walls 12, a front wall 14, a tailgate 16, not illustrated in FIG. 2, and a flat bottom 18. The tailgate 16 is generally hingedly mounted at the rearward portion of bottom 18.

The cover assembly includes sliding cover 20 which is mounted to the cargo bed 10 of the truck by guide means including left track 24 and a right track 26. The sliding cover 20 is illustrated in FIG. 1 in a partially retracted position in that the end of the sliding cover does not quite meet the tailgate 16. The sliding cover 20 includes a plurality of parallel slats 22 and a lockplate 23. When the sliding cover 20 is in the open or retracted position as shown in FIG. 2, it is generally stored in a housing 28 located adjacent the front wall 14 of the cargo bed 10. The cover 20, when fully extended, covers the entire cargo area. The cover 20 can be adapted to lock to the tailgate 16 by a locking system 124 attached to the lockplate 23. The locking system 124 will be more fully detailed hereinafter. The series of interconnected slats 22 forming the cover 20 extends across the open cargo bed 10. The ends of the slats 22 are slidably mounted in the guide means, formed by tracks 24,26. A blocking mechanism, such as a tab or rubberized bumper, may be welded or otherwise attached to the ends 25, 27 of the tracks 24, 26 adjacent the closed tailgate in order to prevent the sliding cover 20 from extending beyond the ends 25, 27 of the tracks 24, 26.

Figure 3:
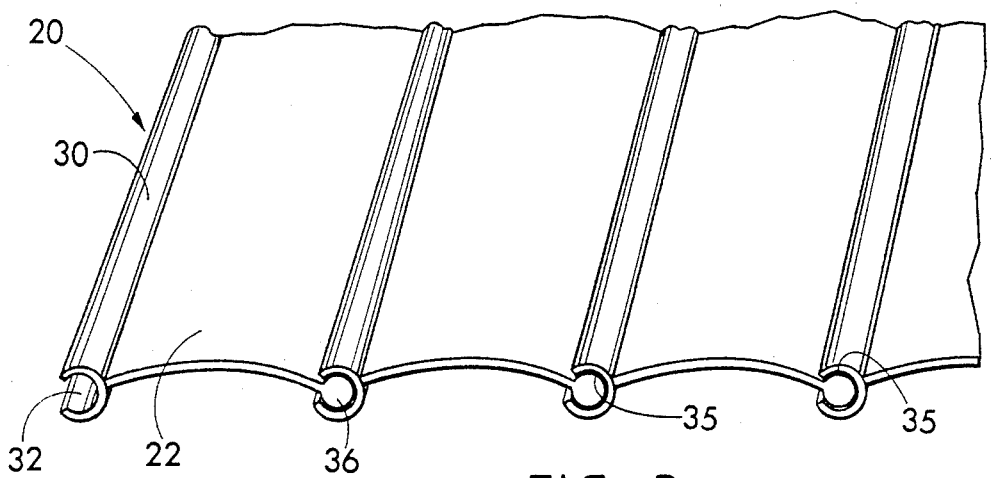
FIG. 3 is a perspective view of the cover assembly of the present invention.
Figure 4:
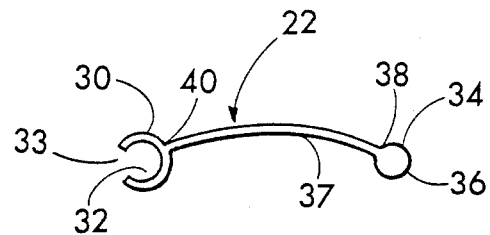
FIG. 4 is a side elevational view of one slat of the cover assembly of FIG. 3.

Referring now to FIGS. 3 and 4, there is illustrated a plurality of parallel, arcuate, rotatably interconnected longitudinal slats 22 successively disposed adjacent one another. Each slat 22 has a first longitudinal side 30 having an arcuate socket portion 32 and a second longitudinal side 34 having a cylindrical rod portion 36, wherein the rod portion 36 of one slat 22 is rotatably disposed within the socket portion 32 of an adjacent slat 22.

Referring now more specifically to the rod and socket connection between each of the slats 22, it can be seen that the arcuate socket portion 32 of the slat 22 is somewhat cylindrical in shape with an opening 33 along the full length of the slat 22 for receiving the cylindrical rod portion 36 connected to the second longitudinal side of an adjacent slat 22. The edge of the socket portion 32 fits snugly around the rod portion 36. By this "rod and socket" connection, the slats are allowed to rotate or roll easily under force from either direction. Yet, when the sliding cover 20 is in the unrolled position, as illustrated in FIGS. 1 and 3, the top edge of the first longitudinal side 30 fits snugly against the top edge of the interconnected rod 36 advantageously forming a substantially water-tight seal at 35. Further, the seal created by the interconnection of side 30 and rod 36 reduces lateral movement of the slats 22 thus minimizing rattle and noise.

The body 37 between the first longitudinal side 30 and the second longitudinal side 34 of the slat 22 has an arcuate shape. The arcuate body 37 in each of slats 22 adds strength to the entire cover 20 without adding excess weight. Further, this arcuate conformation allows the cover 20 to form a smaller diameter roll in the retracted position, decreasing the dimensions of the housing 28 and leaving more useful cargo space in the cargo bed 10. Further, each of the slats 22 are provided with two channels 38, 40 which provide a passageway for water flowing off of the cover 20 to either of the tracks 24, 26.

Figure 5:
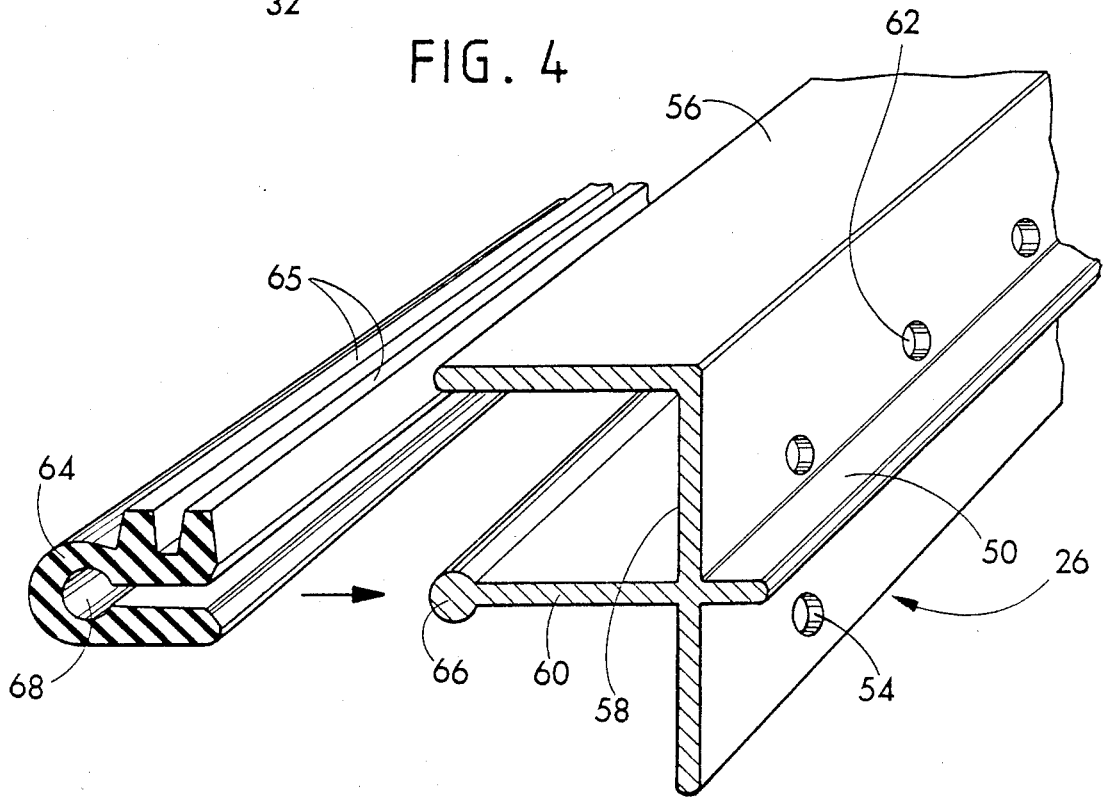
FIG. 5 is an exploded perspective view of the rearward portion of the right track assembly of the present invention.
Figure 6:
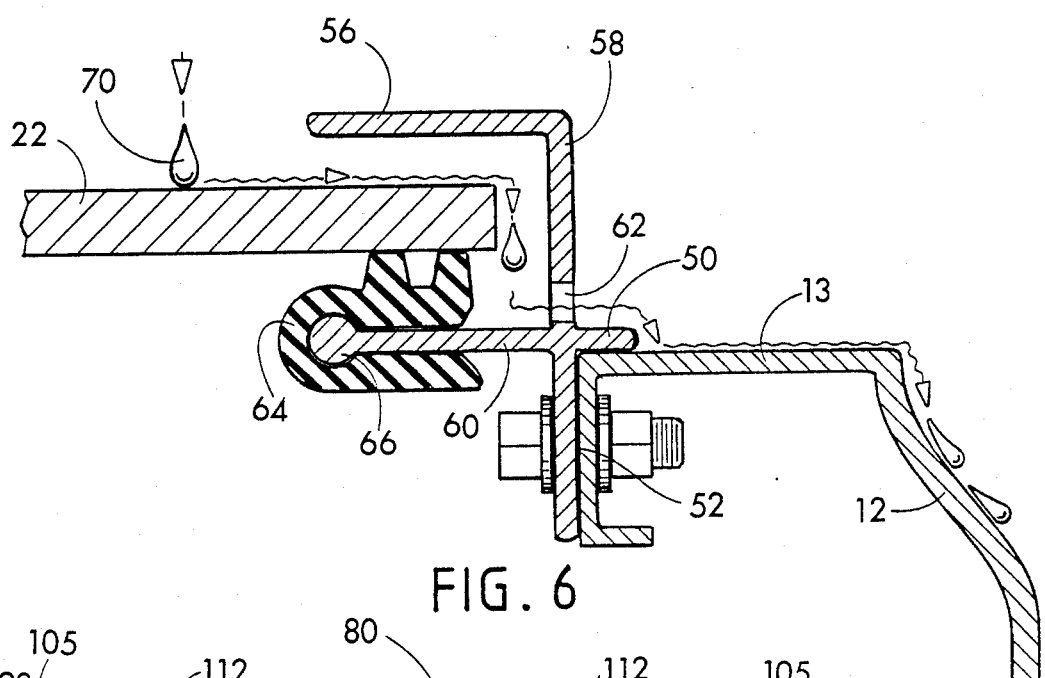
FIG. 6 is a side elevational view of the right track assembly of the present invention taken along lines VI—VI of FIG. 1.

Reference is now made to FIGS. 5 and 6 which illustrate a portion of the right track 26. It is to be understood that the left track 24 is the same, albeit a mirror image, as the right track 26. Each of the tracks 24,26 include an outwardly extending lip 50 which extends over the top edge 13 of the side walls 12 and positions the tracks 24,26 for mounting. Additionally, the lip 50 helps to form a seal between the track and the edge of the cargo bed of the truck. Further, the lip 50 provides stability for the entire track assembly. Although not required, it is preferred to include a piece of weatherstripping, such as a rubber sealant between each of tracks 24,26 and the side walls 12.

As best illustrated in FIG. 6, the track assembly is situated above the top edge 13 of side wall 12. It has been found that this positioning is superior in terms of weatherproofing and added cargo space. The track is bolted or otherwise secured to the side walls 12 of the truck as illustrated by reference numeral 52. Mounting perforations 54 may be added to the track as required.

Each of the tracks 24, 26 are C-shaped in configuration, having an upper edge 56, middle edge 58 and lower edge 60. The cover 20 is designed such that the ends of the slats 22 ride inside the C-shaped configuration of each of tracks 24,26. As illustrated in FIGS. 1 and 2, the tracks extend from a point near the front wall 14 to the tailgate 16. Preferably, the tracks 24, 26 are perforated by a series of drainage holes 62 to drain water 70 from the cover portion 20.

Each of the tracks 24, 26 include a resilient wearstrip 64 mounted on the lower edge 60 of the track. For this reason, the lower edge 60 contains a rod-like extension 66 in order to accomodate a similar shaped opening 68 in the wearstrip 64. The wearstrip 64 can then snap or slide on to the track as desired. The wearstrip 64 is preferably made of a high density, impact resistant, low friction material, such as ABS plastic. The wearstrip 64 is illustrated having a sectioned top surface 65. It is to be understood, however, that the wearstrip could have a solid upper surface. When the wearstrip 64 is in place on the lower edge 60 of the track 24, 26, the wearstrip 64 serves at least a three-part function. First, the wearstrip 64 provides a low-friction surface at 65 on which the slats 22 of the cover 20 slide thus obviating any need for roller wheels. Second, the wearstrip forms a dam which channels water, illustrated at 70, through the drainage holes 62 and down the side walls 12 of the truck body. Third, the wearstrip absorbs impact from sliding cargo or the like, protecting the tracks 24, 26 and the sliding cover 20.

Thus, the sliding cover assembly of the present invention provides a superior water shedding system. Water 70 which falls on the cover 20 is channeled by channels 38,40 to either track 24,26. The water flows to the lower edge 60 of the C-shaped track and, because it is prevented from entering the cargo bed area of the truck by the wearstrip 64, is forced to exit the cargo assembly by means of drainage holes 62.

Figure 7:
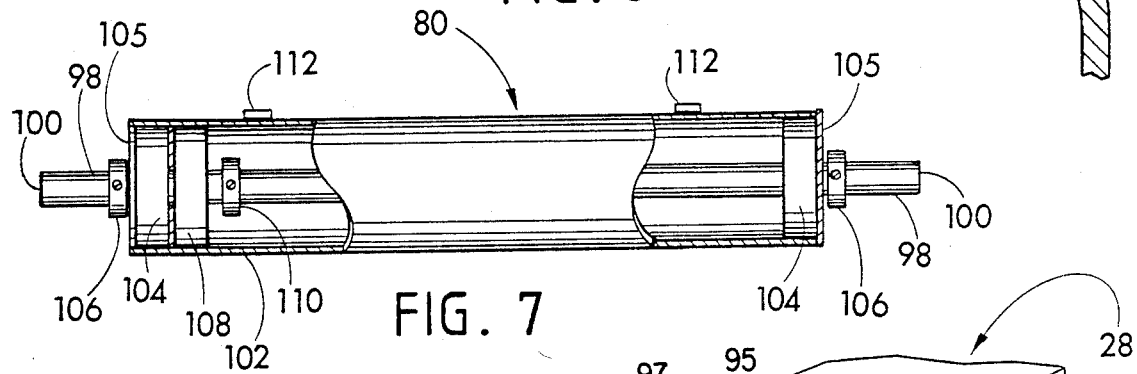
FIG. 7 is a front fragmentary elevational view of the return means of the present invention.

The sliding cover assembly of the present invention further includes a spring-activated return assembly generally indicated at 80 in FIG. 7, which is mounted adjacent the front wall 14 of the cargo bed 10. The spring-activated return assembly 80 is intended to retract the cover 20 in a space-saving rolled storage configuration in the forward portion of the cargo bed 10 adjacent the front wall 14. The return assembly 80 may also include the housing 28 as illustrated in FIGS. 1, 2, 8 and 9. Mounting brackets 84 are welded or otherwise secured to the outside top edge of each end of the housing 28 and are provided with mounting holes 86 to hold the housing 28 at the correct height to join the tracks 24,26. The brackets 84 are the means by which the housing 28 is attached to the side walls 12 of the cargo bed.

Figure 8:
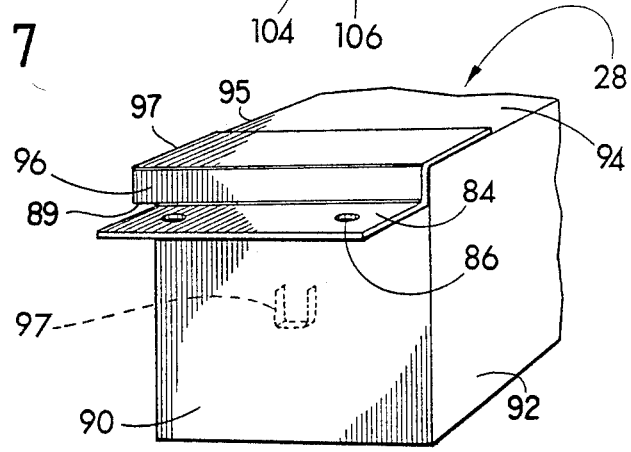
FIG. 8 is a side perspective view of the housing for the return means.
Figure 9:
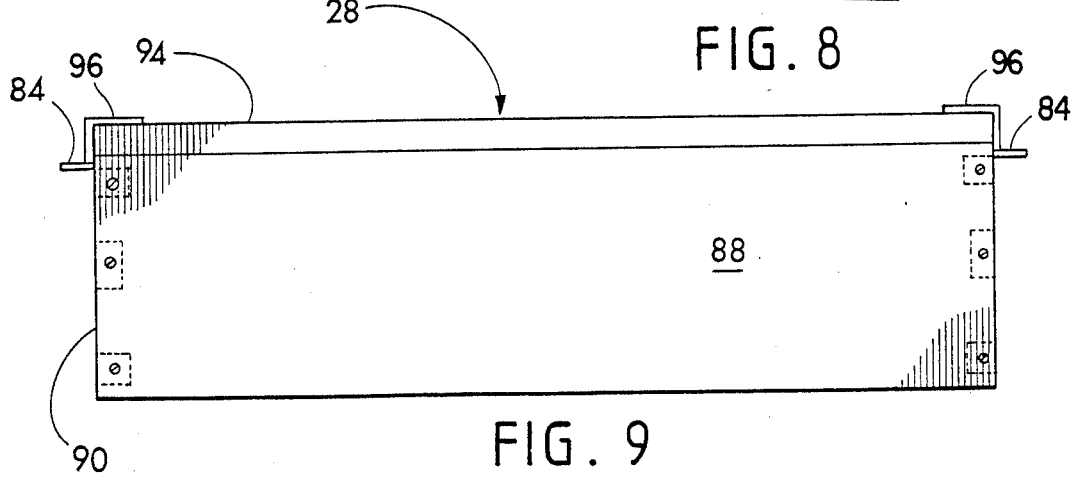
FIG. 9 is a front elevational view of the housing for the return means.

Referring now to FIGS. 8 and 9, the housing 28 comprises a removable front panel or faceplate 88, two side panels 90, a rear panel 92, a cover panel 94 and a floor panel (not shown). The cover panel is characterized by flange 96, which extends sufficiently in front of the faceplate 88 at 89 in order to cover the ends of tracks 24,26. As illustrated in FIGS. 1 and 8, the bracket 84 and the flange 96 may be combined to form a single L-shaped piece wherein the front edge 97 of the flange 96 extends forwardly of the bracket 84 at 89. The front edge 95 of the cover panel 94 is flush with the front edge 97 of the flange 96. U-shaped brackets 97 are welded, or otherwise attached, to the inside center of each side panel 90 to hold the spring-activated return means.

Referring now to FIG. 7, the return means 80 includes an axle 98 of length substantially equal to the distance between the side panels 90 of the housing 28. The ends 100 of the axle 98 are designed to fit in each of the U-shaped brackets 97. The ends 100 of the axle 98 are secured by welding or bolting or other means to the brackets 97 in such a manner as to prevent the axle 98 from rotating. A drum 102 is attached to the axle 98 by means of plastic bearings 104. The bearings 104 fit tightly in the drum 102 and rotate on the axle 98 which is solidly mounted on the brackets 97. Flanges 105, attached to the bearings 104, prevent the bearings 104 from entering the drum 102. Two lock collars 106, known to the art, are attached on either end of the axle 98 in order to securely position the drum 102.

A spiral power spring assembly 108 is positioned within the drum 102 and held in securing attachment thereby means of a lock collar 110. The spring is known to the art and designed to create a certain torque as the cover 20 is extended or unrolled. A spiral power spring (not shown) is housed within assembly 108. One end of both the portion of the axle 98 within the spring assembly 108 and the portion of the drum 102 adjacent the spring assembly 108 is slotted to accept and hold the curved ends of the power spring in a manner known to the art. When the cover 20 is rolled up, the spring 108 provides an adequate force to keep the cover 20 rolled tightly to the drum 102 of the return means.

The drum 102 is provided with clips or other attaching mechanisms 112 which rotatably receive the forwardmost slat 22 of the cover means 20 for rolling the cover 20 onto the drum 102.

Figure 10:
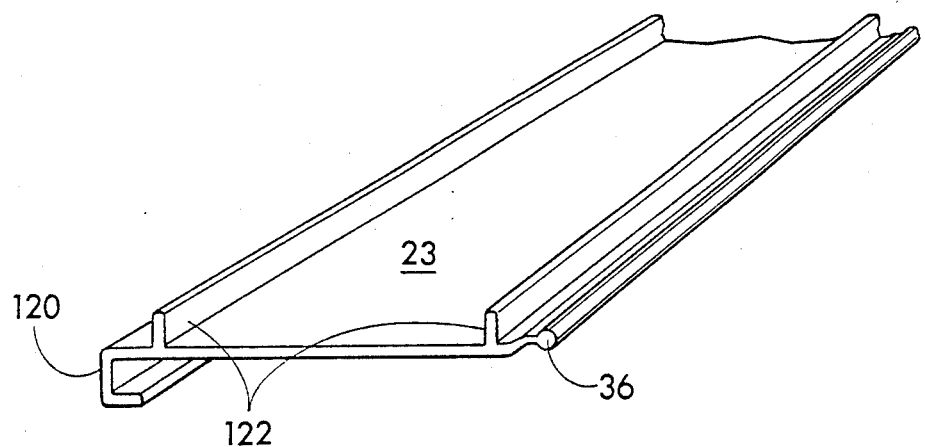
FIG. 10 is a side perspective view of the lockplate of the present invention.

Referring now to FIGS. 1 and 10 ∝ 12, a lockplate 23 is rotatably attached to the leading edge of the cover 20 by means of the rod portion 36. The lockplate 23 is characterized by a double 90° drop leading edge, illustrated at 120, which closes off the gap between the top of the wearstrip 64 and the top of the tailgate 16. Further, the double 90° drop adds integral strength and provides a solid leading edge to the lockplate 23. The leading edge 120 may be notched to ride properly in tracks 24, 26. The edge acts as a guide to keep the assembly from shifting too far to one side or the other. In the closed position, the leading edge 120 extends over the tailgate 16. This prevents the lockplate 23 from being pushed down, thus disengaging the lock.

Additionally, a plurality of upright fins 122 may be added to the lockplate 23 for added strength. The upright fins 122 also serve as a handle for closing and opening the sliding cover assembly.

Figure 11:
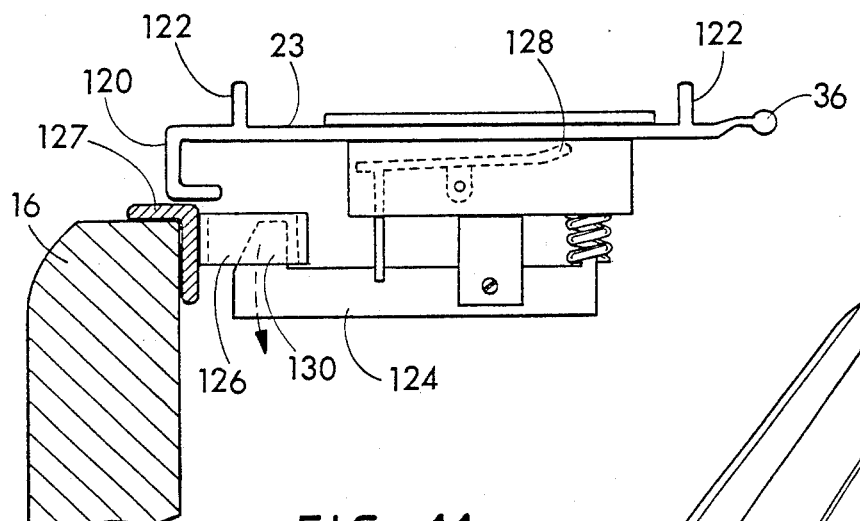
FIG. 11 is a side elevational view of the lockplate of the present invention showing the recessed paddle handle lock.
Figure 12:
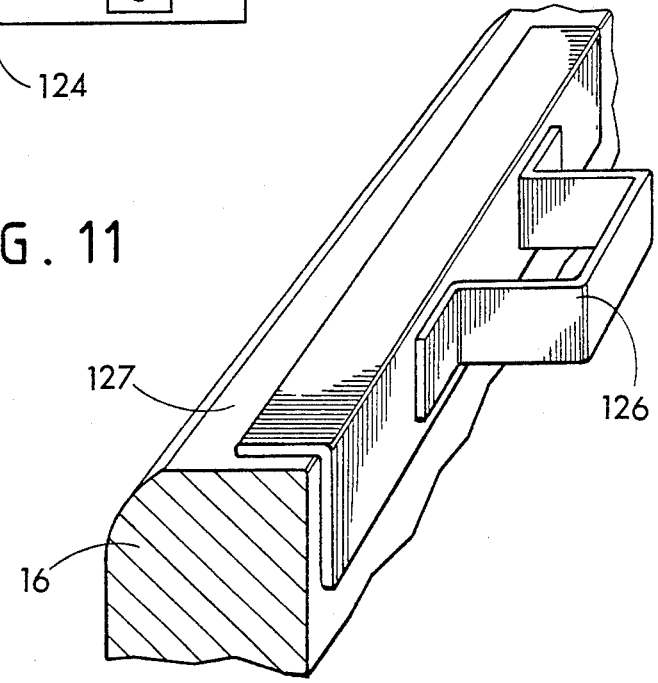
FIG. 12 is a top perspective view of a portion of the tailgate assembly showing the locking ring.

As illustrated in FIGS. 11 and 12, the lockplate 23 may be provided with a recessed paddle-handle lock generally indicated at 124 mounted in the center of lockplate 23. The lock 124 latches to a stainless steel, or similar type material, loop illustrated at 126 which is riveted, or otherwise securely attached, to the tailgate 16 by means of mounting plate 127. A recessed paddle handle 128 is activated by the operator to disengage the catch 130 from the loop 126 thus allowing the sliding cover assembly to open. A key lock may be added to prevent the paddle handle 128 from being raised. Thus, the recessed paddle-handle lock 124 secures both the cover 22 and the tailgate 16, obviating the need for "T" handle rod locks which must generally be latched onto the sides of pickup beds in order to secure both the cover and the tailgate.

In order to achieve the desired qualities of high strength, light weight and low cost, most of the components of the cover assembly of the present invention are preferably made of aluminum. Aluminum provides a superior strength at a minimum weight and relatively inexpensive cost. Further, aluminum is corrosion resistant. The wearstrips 64 are preferably made of a high impact, low friction plastic or rubber material, such as ABS rubber or plastic.

Although the present invention has been described with preferred embodiments, it is to be understood that modifications and variations may be resorted to without departing from the spirit and scope of this invention, as those skilled in the art will readily understand.

What is claimed is:

1. A sliding cover assembly for an open cargo bed defined by a flat bottom, two side walls, a front wall at the front portion of the cargo bed and a tailgate at the rear portion of the cargo bed comprising:
   (a) guide means mounted on the top edges of the side walls of the cargo bed, the guide means extending from the front portion of the cargo bed to the rear portion of the cargo bed, the guide means including a left and right track having upper, middle and lower edges forming a C-shaped cross section, each track further including a lip to facilitate positioning of each track to the top edge of the side walls;
   (b) a cover extending across the open cargo bed including a plurality of parallelly-disposed, arcuate, rotatably interconnected longitudinal slats slidably mounted in the guide means, the slats being successively disposed adjacent one another, each slat including a top side, a bottom side, a first longitudinal edge having an arcuate socket portion and a second longitudinal edge having a cylindrical rod portion, wherein the rod portion of one slat is rotatably disposed within the socket portion of an adjacent slat in a substantially water-tight fashion and wherein the cylindrical rod portion defines a first runoff channel at the top side of the slat and the arcuate socket portion defines a second runoff channel at the top side of the slat;
   (c) a return mean mounted adjacent the front end of the cargo bed and attached to the forward edge of the cover, the return means including a return assembly around which the cover winds when retracted.

2. The sliding cover assembly of claim 1 further comprising a wearstrip attached to the lower edge of each tract to provide a low-friction surface on which the slats slide.

3. The sliding cover assembly of claim 2 wherein the wearstrip is made of a high density, impact resistant, low-friction material.

4. The sliding cover assembly of claim 3 wherein the wearstrip is ABS plastic.

5. The sliding cover assembly of claim 2 wherein the wearstrip snaps onto the lower edge of each track.

6. The sliding cover assembly of claim 2 wherein the wearstrip slides on to the lower end of each track.

7. The sliding cover assembly of claim 1 wherein the track and slats are made of aluminum.

8. The sliding cover assembly of claim 1 wherein the return assembly is spring activated such that when the cover is extended, the spring is wound creating torque and when the cover is retracted, the spring provides adequate force to keep the cover rolled tightly to the return assembly.

9. The sliding cover assembly according to claim 1 wherein the return assembly is mounted within a housing, the housing being mounted adjacent the front wall of the cargo bed, the housing having front and rear panels, top and bottom panels and two side panels.

10. The sliding cover assembly according to claim 9 wherein return assembly comprises an axle fixedly mounted on U-shaped brackets attached to the inside center of each side panel of the housing.

11. The sliding cover assembly of claim 9 wherein the front panel is removable.

12. The sliding cover assembly of claim 1 wherein each of the tracks include a blocking mechanism to prevent the sliding cover from extending beyond the ends of the tracks.

13. The sliding cover assembly of claim 1 wherein the cover further includes a lockplate having a leading edge which extends over the tailgate.

14. A sliding cover assembly for a truck having an open cargo bed defined by a flat bottom, two side walls, a front wall at the front portion of the cargo bed and a tailgate at the rear portion of the cargo bed hingedly mounted to the rear end of the bottom, comprising:
   (a) a pair of guide means mounted on the top edge of the side walls of the cargo bed, the guide means extending from the front portion of the cargo bed to the rear portion of the cargo bed, the guide means including a left and right track, each having upper, middle and lower edges forming a C-shaped cross section, each track further including a lip to facilitate positioning of each track to the top edge of the side walls;
   (b) a cover extending across the open cargo bed including a plurality of parallelly-disposed arcuate, rotatably interconnected longitudinal slats slidably mounted on the wearstrips of each track, the slats being successively disposed adjacent one another, each slat including a top side, a bottom side, a first longitudinal edge having an arcuate socket portion and a second longitudinal edge having a cylindrical rod portion, wherein the rod portion of one slat is rotatably disposed within the socket portion of an adjacent slat in a water-tight fashion and wherein the cylindrical rod portion defines a first runoff channel at the top side of the slat and the arcuate socket portion defines a second runoff channel at the top side of the slat;
   (c) a wearstrip attached to the lower edge of each track in order to provide a low-friction surface on which the slats slide, the wearstrip being made of a high density, impact resistant, low-friction material;
   (d) a spring-activated return assembly mounted adjacent the front end of the cargo bed and attached to the forward edge of the cover, the return assembly including an axle assembly around which the cover winds when retracted, the axle assembly including a rotatable drum which is spring activated such that when the cover is extended, the spring is wound creating torque and when the cover is retracted, the spring provides adequate force to keep the cover rolled tightly to the axle; and
   (e) housing for the return assembly, the housing being mounted on the top edge of the side walls adjacent the front wall of the cargo bed, the housing having front and rear panels, top and bottom panels and two side panels, wherein the axle is mounted an U-shaped brackets attached to the inside center of each side panel of the housing.

* * * * *